US011915054B2

(12) United States Patent
Mitra et al.

(10) Patent No.: US 11,915,054 B2
(45) Date of Patent: Feb. 27, 2024

(54) SCHEDULING JOBS ON INTERRUPTIBLE CLOUD COMPUTING INSTANCES

(71) Applicant: Adobe Inc., San Jose, CA (US)

(72) Inventors: Subrata Mitra, Bangalore (IN); Sunav Choudhary, Kolkata (IN); Sheng Yang, Evanston, IL (US); Kanak Vivek Mahadik, San Jose, CA (US); Samir Khuller, Silver Spring, MD (US)

(73) Assignee: Adobe Inc., San Jose, CA (US)

( * ) Notice: Subject to any disclaimer, the term of this patent is extended or adjusted under 35 U.S.C. 154(b) by 295 days.

(21) Appl. No.: 17/324,692

(22) Filed: May 19, 2021

(65) Prior Publication Data

US 2022/0374276 A1 Nov. 24, 2022

Related U.S. Application Data

(60) Provisional application No. 63/180,942, filed on Apr. 28, 2021.

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4818* (2013.01); *G06F 9/4856* (2013.01); *G06F 9/4881* (2013.01)

(58) Field of Classification Search
CPC .... G06F 9/5038; G06F 9/4818; G06F 9/4856; G06F 9/4881
See application file for complete search history.

(56) References Cited

U.S. PATENT DOCUMENTS 10,552,774 B2 * 2/2020 Shih ................. G06Q 10/06315

FOREIGN PATENT DOCUMENTS

CN 104965755 A * 10/2015
CN 112231091 A * 1/2021 ........... G06F 9/4881

OTHER PUBLICATIONS

Ali-Eldin Ahmed, et al., "SpotWeb: Running Latency-sensitive Distributed Web Services on Transient Cloud Servers", ACM, The 28th International Symposium on High-Performance Parallel and Distributed Computing (HPDC '19), Jun. 2019, 12 pages.

(Continued)

*Primary Examiner* — Diem K Cao
(74) *Attorney, Agent, or Firm* — Finch & Maloney PLLC

(57) ABSTRACT

Techniques are provided for scheduling multiple jobs on one or more cloud computing instances, which provide the ability to select a job for execution from among a plurality of jobs, and to further select a designated instance from among a plurality of cloud computing instances for executing the selected job. The job and the designated instance are each selected based on a probability distribution that a cost of executing the job on the designated instance does not exceed the budget. The probability distribution is based on several factors including a cost of prior executions of other jobs on the designated instance and a utility function that represents a value associated with a progress of each job. By scheduling select jobs on discounted cloud computing instances, the aggregate utility of the jobs can be maximized or otherwise improved for a given budget.

20 Claims, 8 Drawing Sheets

(56) References Cited

OTHER PUBLICATIONS

Fukunaga Takuro et al., "Stochastic Submodular Maximization with Performance-Dependent Item Costs", The Thirty-Third AAAI Conference on Artificial Intelligence, 2019, 10 pages.
Gupta Anupam et al., "Approximation Algorithms for Correlated Knapsacks and Non-Martingale Bandits", arXiv:1102.3749v1, Feb. 18, 2011, 35 pages.
Harlap Aaron et al., "Tributary: spot-dancing for elastic services with latency SLOs", Proceedings of the 2018 USENIX Annual Technical Conference, 2018, 14 pages.
Sharma Prateek et al., "Portfolio-driven Resource Management for Transient Cloud Servers", Proc. ACM Meas. Anal. Comput. Syst., vol. 1, Jun. 2017, 23 pages.

\* cited by examiner

Rounding Methodology

1 for *Partition group $I_k$* do
2      Sample $(i,t)$ from $I_k \times [C]$, get $(i,t)$ with probability $x_{\rho_i,t}$, and gets $\emptyset$ with probability $1 - \sum_{i \in I_k} \sum_t x_{\rho_i,t}$;
3      if *not get $\emptyset$* then
4          $I \leftarrow I \cup \{(i,t)\}$ ;

5 Sort $I$ according to a non-decreasing ordering of $t$, break ties uniformly at random ;
6 $C = 0, S = \emptyset$, mark all times slots available ;
7 for $(i,t) \in I$ do
8      if *time slot $t$ is available* then
9          Include item $i$ ;
10          Observe $s_i$ ;
11      else
12          Simulate including item $i$, and observe $s_i$;
13      Mark time slots from $t$ to $t + s_i$ unavailable;

FIG. 4

SCHEDULING JOBS ON INTERRUPTIBLE CLOUD COMPUTING INSTANCES

CROSS REFERENCE TO RELATED APPLICATION

This application claims the benefit of U.S. Provisional Patent Application No. 63/180,942, filed Apr. 28, 2021, which is incorporated by reference herein in its entirety.

FIELD OF THE DISCLOSURE

This disclosure relates generally to scheduling of computing jobs, and more particularly, to techniques for scheduling jobs on interruptible cloud computing instances.

BACKGROUND

Cloud computing provides various computing services over the Internet. These services can include servers for data processing and application execution, storage and databases for maintaining data records, networking for connecting systems together, and other types of resources. An advantage of cloud computing is an ability of the service provider to readily scale resources to economically meet the needs of the customer. Thus, instead of incurring the expense of purchasing and maintaining proprietary computer equipment for performing certain tasks, cloud computing provides any client device with access to a wide range of resources so long as the client as access to the Internet. For example, cloud computing resources can be provisioned to meet a customer's demand for critical services. In such cases, service providers may guarantee uninterrupted access to the resources at certain price points that are driven at least in part by availability of the resources and demand for such uninterrupted access. In practice, the actual demands can fluctuate due to factors such as the customers' time of day and seasonal usage patterns. During times of low actual demand, service providers may offer otherwise unused resources at significantly discounted rates but without the guarantee of uninterrupted access. Such discounted resources are variously referred to as interruptible instances, spot instances, low priority virtual machines, preemptible instances, and transient virtual machines or servers. The rates for these interruptible instances can be significantly less than standard prices and are therefore attractive to customers.

Nevertheless, there are additional costs associated with such instances when they are interrupted or otherwise preempted before the customer's job has completed executing. For example, it can be difficult to resume processing of a partially completed stateful job (one that uses backing storage to execute) because the state of the job at the point of interruption must be stored before the interruption occurs, sometimes with little or no notice. Furthermore, even if the state of the job is stored, it must be subsequently restored to a different cloud computing instance before the job can resume, all of which consumes additional resources and has attendant costs. If, due to interruption, the budget for executing a particular job will be exceeded before the job can complete or make reasonable progress, then the budget may more appropriately be given to another job that has a greater chance of making progress or completing within the available budget. Thus, a trade-off exists between the cost and the availability of interruptible cloud computing instances, which complicates the task of determining which of several jobs should be scheduled on a given interruptible instance within a given budget.

SUMMARY

Techniques are provided herein for scheduling jobs on one or more interruptible cloud computing instances. The disclosed techniques can be used, for example, to provide the ability to select a job for execution from among a plurality of jobs, and to further select a designated cloud computing instance from among a plurality of cloud computing instances for executing the selected job. For example, the job can be selected based on a probability distribution on the time and cost of executing the job on the designated instance before interruption, where the probability distribution is based on a profiling of prior executions of jobs on the designated instance. The selection is also based on a utility function, which jointly describes how the progress of each job is valued. The decision of which jobs to schedule, and on which instances, is modeled as an optimization problem (e.g., a stochastic correlated knapsack problem). A solution to the problem includes maximizing the aggregated utility of jobs that can be executed on one or more cloud computing instances within the given budget, accounting for the costs of executing the jobs on the instances and any overhead costs associated with jobs that are interrupted and subsequently rescheduled, as may occur on discounted cloud computing instances. The disclosed techniques can be used in any number of applications, but are particularly useful for stateful applications, such as machine learning training jobs or other iterative jobs that provide diminishing returns as the number of iterations, or epochs, of execution increases.

The disclosed techniques recognize that maximizing or otherwise improving the utility, or productivity, of using interruptible cloud computing instances of varying types, costs, and speeds for executing multiple jobs within a given budget is a non-trivial problem. For example, the execution speed of a given job can be significantly different across different instance types. Furthermore, the probability distribution that a job will be able to run before interruption also varies across different types of instances with different discounts available over the original pricing, in part due to the organic supply of, and demand for, these instances. Thus, if a job is scheduled on an arbitrarily selected instance, not only might the execution speed be slower than desired, but there is also a chance that the job could be interrupted so frequently that the total cost of the job exceeds the benefit of using the discounted instance, as well as potentially exceeding the budget for executing all of the jobs that need to be scheduled. To reduce this risk, the jobs should be scheduled, at least, according to an estimate of how much productivity can be extracted from the instances for each job while remaining within the overall budget.

To this end, an embodiment of the present disclosure leverages the iterative nature of certain jobs, such as machine learning training jobs derived from stochastic gradient descent type algorithms, where each new iteration provides a diminishing marginal increase in utility (e.g., validation accuracy). The utility of a job can be represented, for example, by a piece-wise linear model that approximates the diminishing marginal returns of each job in a set of jobs. The budget is used to determine which jobs to schedule such that the aggregate utility across all of the jobs is maximized or otherwise improved. In some embodiments, the scheduling of jobs is found by optimizing job utility (completeness with respect to cost) on the cloud computing instances for each dollar of the available budget. These techniques can leverage the use of discounted cloud computing instances to achieve maximal or otherwise improved job utility at significantly lower cost.

Any number of non-transitory machine-readable mediums (e.g., embedded memory, on-chip memory, read only memory, random access memory, solid state drives, and any other physical storage mediums) are used to encode instructions that, when executed by one or more processors, cause an embodiment of the techniques provided herein to be carried out, for cloud computing instance scheduling. Likewise, the techniques can be implemented in hardware (e.g., logic circuits such as field programmable gate array, purpose-built semiconductor, microcontroller with a number of input/output ports and embedded routines).

BRIEF DESCRIPTION OF THE DRAWINGS

FIG. 4 shows an example rounding methodology that can be used by the scheduling system of FIG. 1, in accordance with an embodiment of the present disclosure.

DETAILED DESCRIPTION

Figure 1:
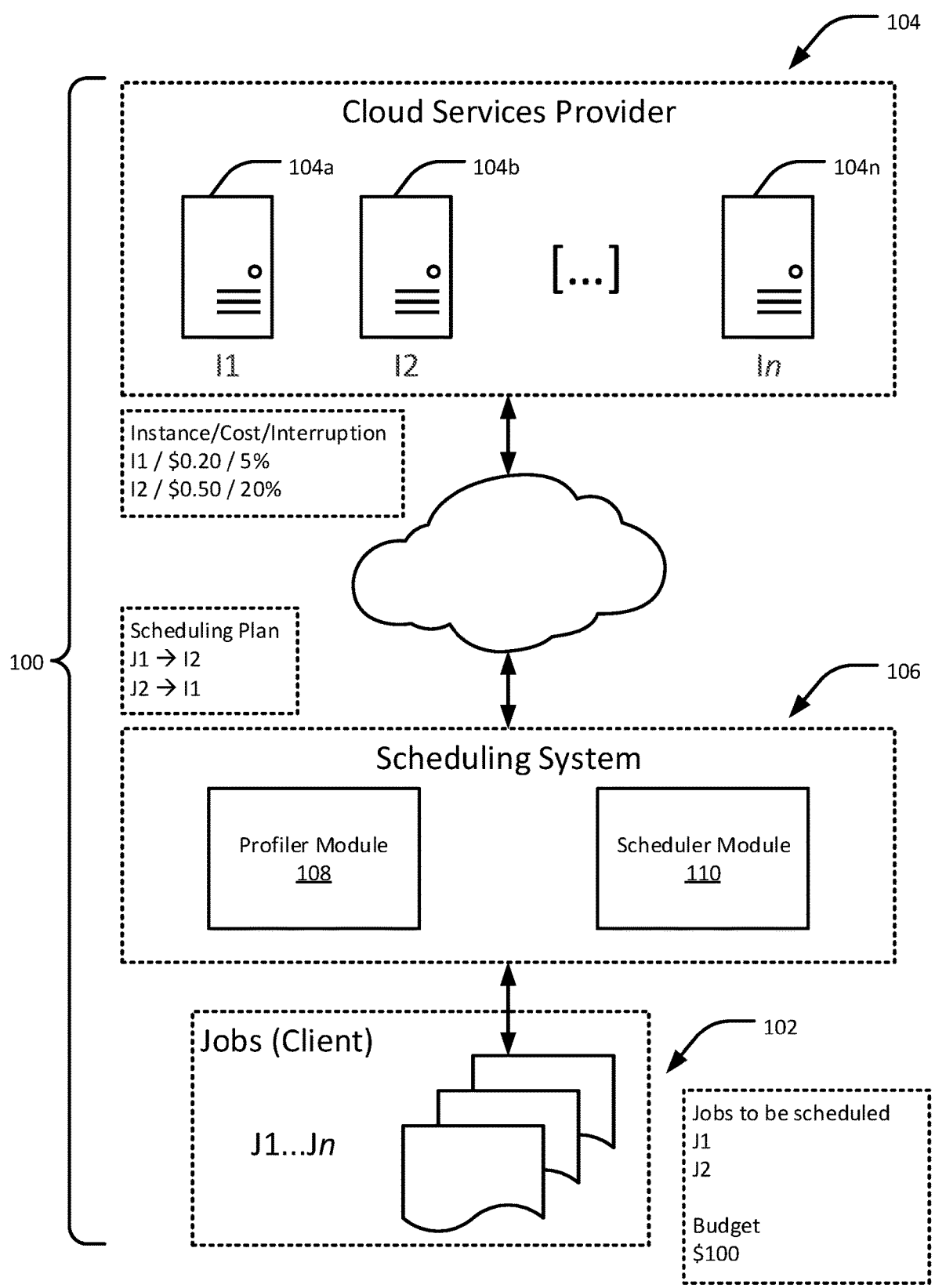
FIG. 1 shows a block diagram depicting an example environment for scheduling one or more jobs from a client on a cloud services provider via a scheduling system, in accordance with an embodiment of the present disclosure.

Techniques are provided herein for scheduling jobs on one or more interruptible cloud computing instances. The techniques provide, for instance, the ability to select one or more jobs for execution within a budget for executing a plurality of jobs, and to further select a designated instance from among a plurality of cloud computing instances for executing the selected job or jobs. The job(s) and the designated instance(s) are each selected based on a probability that a cost of executing the job(s) on the designated instance(s) does not exceed the budget. The probability is based on several factors including a cost of prior executions of jobs on the designated instance and a utility function representing an expected amount of completion of each job prior to an interruption, if any occurs. By scheduling selected jobs on discounted (surplus) cloud computing instances, the aggregate utility of the jobs can be maximized or increased for the given budget. As will be appreciated in light of this disclosure, the techniques are particularly beneficial for scheduling budget constrained stateful jobs that potentially provide valid and useful results even if they are interrupted prior to completion, such as machine learning training jobs that can theoretically execute indefinitely, albeit with diminishing marginal returns.

For example, in accordance with some embodiments, an example machine learning training job is a process for training a machine learning model. Training a machine learning model typically involves executing an iterative algorithm, such as a gradient descent. A gradient descent is a first-order iterative optimization algorithm for finding a local minimum of a differentiable function. While the gradient descent produces increasingly accurate and valid estimates of the machine learning model parameters with each iteration, or epoch, the algorithm also has diminishing marginal returns, which reduce the utility of the machine learning training job as the number of epochs increases. Thus, the number of epochs to be executed can be chosen so as to accommodate the available budget while still providing valid results for as many jobs as possible. Notably, machine learning training jobs, including training of deep neural networks, are computationally expensive and time consuming, often taking days, weeks, or even months to complete satisfactorily. Therefore, utilizing discounted cloud computing instances can significantly reduce costs for machine learning training jobs as long as those instances are selected in a non-arbitrary manner that provides a maximal or otherwise improved amount of utility for as many jobs as possible.

However, as noted above, determining which of several machine learning training jobs should be scheduled, and on which cloud computing instance, for a given budget is a non-trivial problem. For example, if a machine learning training job is executed on a discounted cloud computing instance, the job will run either until an interruption occurs or until the budget for executing the job is consumed, whichever occurs first. If there is still budget remaining, an interrupted job can be rescheduled, and execution is resumed from the most recent state of completion of the job at or prior to the interruption (as opposed to restarting the job from the beginning). Furthermore, each time the job is interrupted, it can be repeatedly rescheduled until the budget is consumed. The utility of the job is the amount of completion (total progress) of the job at the point where the budget is consumed, including the overhead costs associated with rescheduling the job one or more times due to interruptions. Typically, the utility of a single job is a sub-additive function of the number of epochs. However, when multiple jobs are jointly considered, there is a cost-benefit trade-off associated with the additional utility received for executing a given job versus the additional utility received for executing a different job such that the budget, which is fixed for executing any or all of the jobs, is spent on the job or jobs that have the greatest marginal utility gain.

Thus, to maximize or increase the utility of multiple jobs, several factors need to be considered when selecting which jobs are to be scheduled and on which cloud computing instances those jobs should be executed. One such factor includes any overhead processing incurred when a job is rescheduled after each interruption. If the overhead is large enough, or if the interruption frequency is high enough, then the overall time and hence the cost for executing a given job on a discounted cloud computing instance may exceed the cost of executing the same job on a higher-cost, but interruption-free, on-demand cloud computing instance. This trade-off between utilizing discounted cloud computing instances, which can be interrupted, and utilizing non-discounted cloud computing instances, which are uninterruptable, for executing jobs can be modeled as a stochastic correlated knapsack optimization problem.

In the stochastic correlated knapsack, items of stochastic states are packed into a capacitated bag. For a given set of items, each with a weight and a value, the problem seeks to determine the number of each item that can be included in a set of items such that the total weight of all items in the set is less than or equal to the maximum capacity of the set (the capacitated bag) and such that the total value of all items in the set is as large as possible. Thus, different combinations of items in the set can result in different total weights and values when the set reaches capacity. However, the weight and the value of each item is not individually known until the item is added to the set because these weights and values are functions of the weights and values of other items in the set (as many items as can fit into the capacitated bag). Therefore, to solve the optimization problem, items are added one by one into the set until the set reaches maximum capacity (i.e., the bag is full or overflowing), and the total value of that set is the combined value of all items in the set, excepting the value of the item that caused the overflow, if any.

In the context of the disclosed techniques, the capacitated bag represents the budget, and the items in the capacitated bag are decisions for scheduling a particular job, such as a machine learning training job, on a certain interruptible cloud computing instance. However, determining the value of a given job is complicated because the job can potentially be interrupted any number of times prior to completion. Job interruptions may indicate an imbalance between the demand for a given computing instance and the availability of the instance for executing the job. Such an imbalance may discourage further use of that particular instance, thus restricting the options for scheduling the job to other available instances. Furthermore, some cloud providers impose quotas on the number of copies of a particular instance that can be used to execute a job, again restricting the options for scheduling the job. Therefore, setting aside the cost of a given cloud instance for a moment, certain instances that have a high incidence of interruptions, or those that are subject to quotas, may be less desirable than instances with a relatively lower incidence of interruptions or those with higher quotas.

Another factor for consideration is non-linearity of the utility (validity) among all of the jobs that need to be executed. For example, typical machine learning training jobs have diminishing marginal returns, where twice the number of epochs will not give twice the utility. Furthermore, determining the value of a combination of interrupted training epochs is non-trivial and is further complicated when multiple jobs need to be executed within a given budget and where the cloud instances are heterogeneous due to the underlying differences in architecture, which affects the processing speed. With various levels of discounts and pricing associated with different discounted cloud instances, the interruption probability—that is, the likelihood that a particular instance will be interrupted within a certain period of time (e.g., a week or a month)—also varies greatly (from less than 5% to more than 25%, in some cases). Such interruption probability is influenced by the variable demand and supply of these discounted cloud instances. Thus, if a machine learning training job is scheduled to run on an arbitrarily chosen instance, not only might the job execute slowly due to differences or incompatibility in architecture and processing capacity, but the job might also be interrupted with little to no warning. The overhead costs associated with these interruptions, in combination with the cost of executing the job, can potentially exceed the cost of executing the job on an on-demand (uninterruptible but expensive) cloud instance. As such, in view of these trade-offs, the problem of determining which jobs to schedule, and where, for a given budget is non-trivial.

To this end, techniques are disclosed for scheduling multiple jobs on one or more interruptible cloud computing instances. A scheduling system is configured to perform at least two functions: determining the utility of one or more jobs executing on one or more cloud computing instances and scheduling the jobs on the cloud computing instances according to their utility and a given budget for executing the jobs. The utility is determined by executing (profiling) each of the jobs, at least partially, on at least one of the cloud computing instances and measuring the performance of the jobs, such as execution time, execution cost, and frequency of interruptions, which provides an estimate of an expected amount of completion of the job (progress) prior to an interruption and the associated cost of executing the job on the respective instance. Based on the utility, the scheduling system selects, by solving an optimization problem, the job or jobs and instance or instances that will maximize or otherwise improve the utility of the jobs for a given budget and schedules the selected jobs on the designated instances. The scheduling system further monitors job performance to improve the optimization over time.

Example Cloud Computing Instance Scheduling Environment

FIG. 1 shows a block diagram depicting an example environment 100 for scheduling one or more jobs 102 from a client on a cloud services provider 104 via a scheduling system 106, in accordance with an embodiment of the present disclosure. The cloud services provider 104 provides one or more cloud computing instances 104a . . . 104n configured to execute one or more of the jobs 102. A "cloud computing instance," "cloud instance," or simply an "instance" refers to an instance of a virtual machine or processing environment provided remotely over a network (e.g., the Internet). The cloud instances 104a . . . 104n can be implemented by the cloud services provider 104 on one or more servers or other computing devices, including virtual processors. The cloud instances 104a . . . 104n are dynamic, which permits any number of servers to be combined on demand and as needed to avoid processing delays or interruptions of the jobs 102. The cloud instances 104a . . . 104n can be freely allocated and can span multiple machines to achieve maximum or increased utilization of the available processing resources. The cloud instances 104a . . . 104n also reduce the downtime associated with servicing hardware, whether it be servers or network equipment. For example, a cloud instance 104a . . . 104n can be easily moved from one physical machine to another without a loss of availability. The cloud instances 104a . . . 104n also permit seamless transfers of data from one machine to another without interrupting execution of any of the jobs 102.

The scheduling system 106 includes a profiler module 108 and a scheduler module 110. The scheduling system 106 interacts with the services provider 104, which provides one or more cloud computing instances 104a . . . 104n. Each of the cloud computing instances 104a . . . 104n is configured to execute a job 102. The scheduling system 106 is configured to receive a request to schedule one or more of a plurality of jobs 102. The request includes a budget representing a maximum permitted cost to execute a combination of the jobs to be scheduled for execution on the cloud computing instances 104a . . . 104n. The scheduling system 106 is further configured to select i) a job for execution from among the plurality of jobs 102 and ii) a designated instance from among a plurality of cloud computing instances 104a . . . 104n for executing the job selected for execution. The selecting of the job 102 and the designated instance 104a . . . 104n is based on a probability distribution on a time and a cost of executing the job selected for execution on the designated instance before interruption. Cost can be measured, for example, as the total cost to utilize a given instance 104a . . . 104n to complete the job, or the hourly cost to execute the job multiplied by the number of hours of job execution. The probability distribution is based on a profiling of prior executions of other jobs 102 on the designated instance 104a . . . 104n. The selection is also based on a utility function representing an amount of completion of the job 102 after a certain amount of progress (i.e., prior to an interruption). The scheduling system 106 is further configured to send a request to execute the job 102 selected for execution to the designated instance 104a . . . 104n. Thus, the scheduling system determines which job(s) to schedule and on which instance(s) based on the cost of executing the job(s) and the utility of executing the job(s) on the designated instance(s).

As noted above, the utility of a given job is the amount of completion (measured as progress or validity of results) of the job at the point where the budget is consumed, including the overhead costs associated with rescheduling the job one or more times due to interruptions. If there are multiple jobs, there is a cost-benefit trade-off associated with the additional utility received for executing a given job versus the additional utility received for executing a different job such that the budget, which is fixed for executing any or all of the jobs, is spent on the job or jobs that have the greatest marginal utility gain. To determine the utility of a given job 102, the profiler module 108 is configured to consider the historical performance of the job on one or more of the cloud computing instances 104a . . . 104n. Then, the scheduler module 110 receives requests to schedule multiple jobs 102 and a budget for executing any one or more of those jobs on one or more of the cloud computing instances 104a . . . 104n. The scheduler module 110 selects which job or jobs 102 to schedule on which of the cloud computing instances 104a . . . 104n based on an optimization of the utility of each of the jobs, as determined by the profiler module 108. The optimization seeks to maximize or increase the combined utility of the jobs within the budget constraint, considering the costs of executing the jobs on the instances and the overhead costs associated with any anticipated interruptions that occur during execution on the designated instance(s). Thus, it will be understood that the request to schedule the jobs is not necessarily fully satisfied; rather, the scheduling system seeks to schedule as many of the jobs as possible to achieve the greatest amount of utility (completeness of the jobs) without exceeding the budget. As discussed above, this optimization is non-trivial.

Profiler Module

Figure 2:
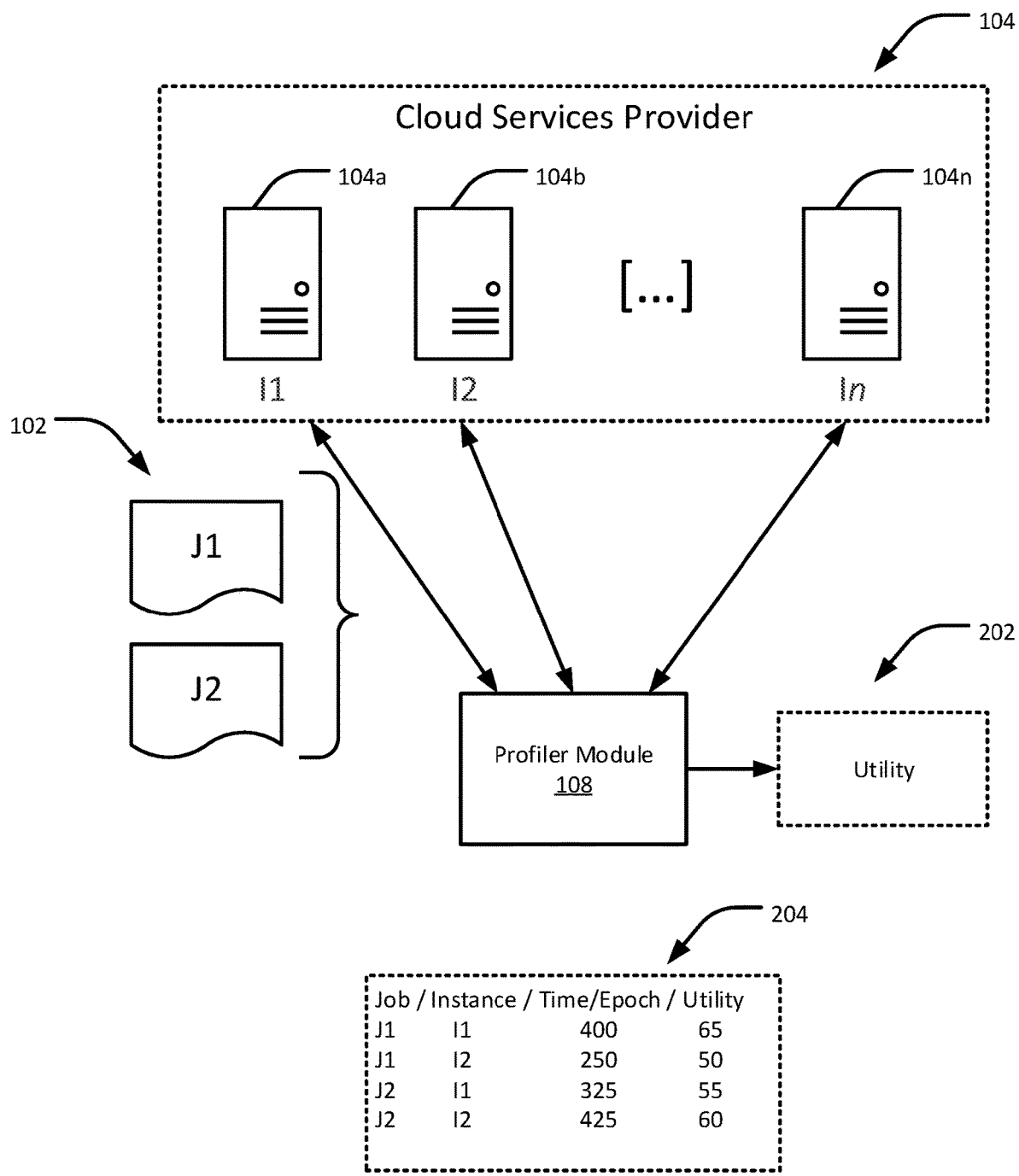
FIG. 2 is a block diagram of an example of operation of a profiler module of the scheduling system of FIG. 1, in accordance with an embodiment of the present disclosure.

FIG. 2 is a block diagram of an example of operation of the profiler module 108 of FIG. 1, in accordance with an embodiment of the present disclosure. The profiler module 108 runs each of the jobs 102 multiple times on each of the cloud computing instances 104a . . . 104n to build a historical record of the performance of the jobs, namely, a value representing the utility 202 of the job when it is executed on a given cloud computing instance. For example, the profiler module 108 runs job J1 on instance I1 multiple times and records the number of epochs (or the execution time) of the job before the job was interrupted on that instance. The profiler module 108 also runs job J1 on instance I2 in a similar manner, and so forth, to determine the utility function 202 of job J1 on each of the instances I1 . . . In. It will be noted that when the profiler module 108 runs each of the jobs 102, the goal is not necessarily to obtain valid results from the jobs but rather to measure their execution performance (progress) on one or more of the instances 104a . . . 104n. This data provides a reasonably accurate estimate of how other similar jobs will perform on the instances 104a . . . 104n in the future, and thus the data generated by the profiler module 108 is used by the scheduler module 110 for scheduling those jobs.

A reason for determining the utility of the jobs 102 on the instances 104a . . . 104n is because cloud service providers usually only provide a generalized description of the frequency of interruptions that occur on each of the instances. However, this data does not describe the nature of the jobs, only the frequency of interruptions. Nevertheless, a baseline distribution of interruptions can be obtained from this data. Thus, by running a set of known jobs on each of the instances multiple times, as discussed above, and tracking the number of times these jobs are interrupted, the profiler module 108 can update or otherwise modify the baseline distribution to provide a more accurate estimate of the actual distribution of interruptions. Furthermore, additional data can be obtained from running other jobs on similar types of cloud computing instances (i.e., discounted instances that can be interrupted). Note that for the purpose of determining the utility of a job, it is not necessary for the profiler module to execute each job end-to-end (i.e., to completion or validation). Rather, a sampling of several hundred epochs of execution provides a reasonable estimate of the job's utility for use by the scheduler module 110.

To this end, the profiler module 108 records the time that elapses between sending a request to execute each of the jobs 102 to the cloud services provider 104 and when the job begins execution on one of the instances 104a . . . 104n. During this time, the cloud services provider 104 grants the request, prepares the instance, and provides access credentials to the profiler module 108. Additionally, during this time, the profiler module 108 downloads the current state of execution of the job 102 on the instance and stores it as a snapshot. This time is considered part of the rescheduling overhead, since these tasks are performed each time the job 102 is scheduled regardless of whether the job is executing for the first time or has previously been interrupted and execution is resumed from the point where it was interrupted. Next, the job 102 is allowed to execute for some period of time on the instance 104a . . . 104n. For example, if the job 102 is a machine learning training job, the profiler module 108 allows the job to execute for at least a few hundred epochs. The profiler module 108 then records the mean time to execute each epoch, which provides a reasonably accurate measure of the execution speed on the particular instance regardless of the machine learning model being trained, since most such training jobs use a similar amount of processing resources. This information about the rescheduling overhead and the mean time per epoch represents an estimate of the efficiency of the instance for executing a particular type of job (e.g., a machine learning training job). The efficiency, combined with the cost of executing the job 102 on the instance, is used by the scheduler module 110 to select which jobs are to be scheduled on which instances 104a ... 104n.

The profiler module 108 is further configured to determine the utility 202 of each job 102 that is run by observing multiple runs of each job on any instance 104a ... 104n. The utility function 202 is a function of the number of epochs completed for each job. The utility function 202 is recorded as a piece-wise linear model for each of the jobs 102, which represents the increase in the marginal utility for each of the jobs as execution progresses. The profiler module 108 stores the utility 202 in, for example, a matrix indexed by the job 102 and the instance on which the job was executed, such as indicated at 204. The utility 202 is exposed to the scheduler module 110 as an oracle that provides, for a given amount of processing, how much utility the job 102 achieves, and, for a given utility, the minimum amount of processing needed to achieve it.

Scheduler Module

Figure 3:
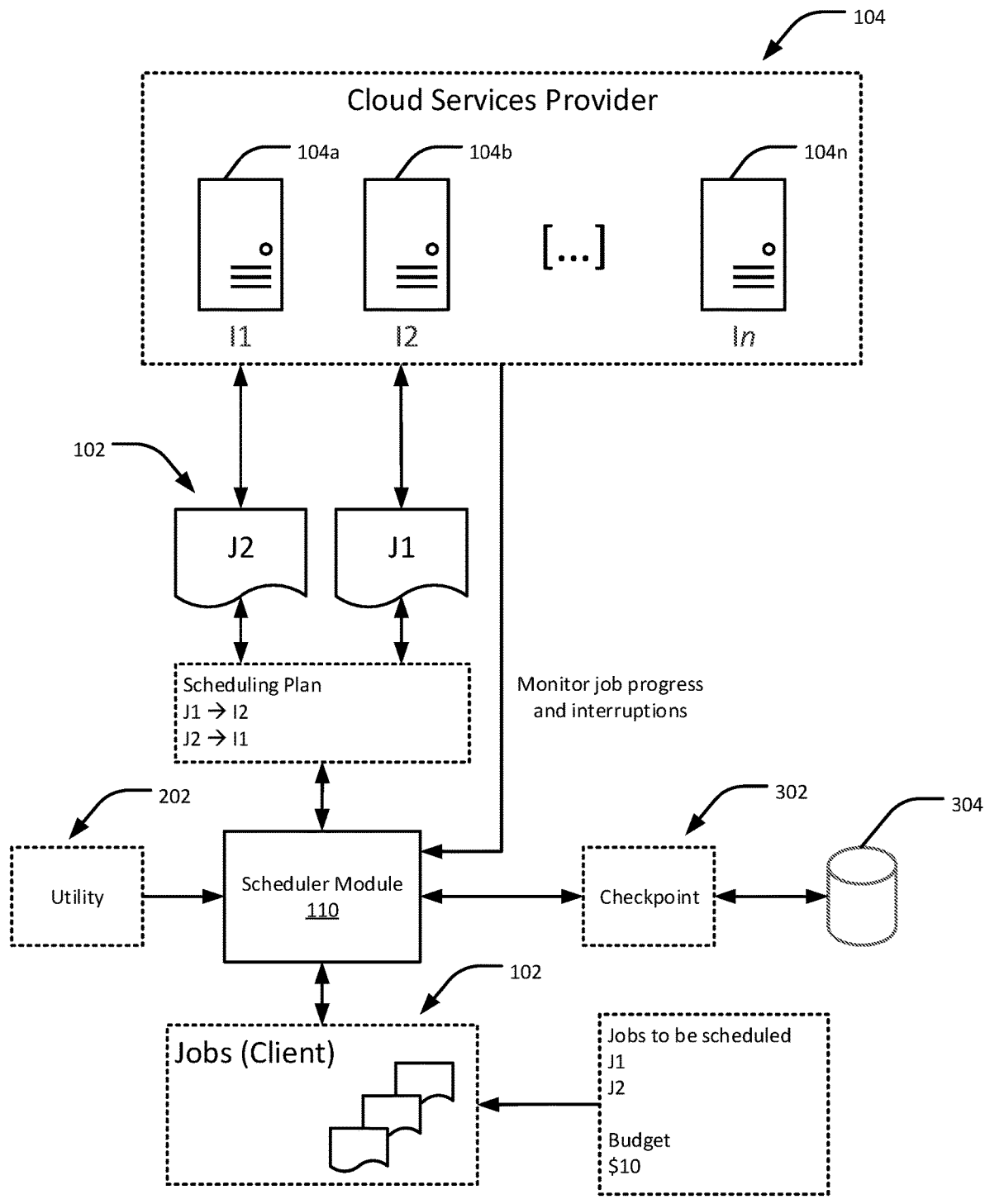
FIG. 3 is a block diagram of an example of operation of a scheduler module of the scheduling system of FIG. 1, in accordance with an embodiment of the present disclosure.

FIG. 3 is a block diagram of an example of operation of the scheduler module 110 of FIG. 1, in accordance with an embodiment of the present disclosure. The scheduler module 110 selects one or more jobs 102 to be executed on one or more instances 104a ... 104n based on the utility 202, as determined by the profiler module 108, and the budget for executing the jobs. Using these two inputs (utility and budget), the scheduler module 110 solves an optimization problem to determine which job(s) 102 to select and on which instances the jobs are to be executed, and how to adapt to stochastic interruptions.

As described in further detail below, there are several ways to solve the optimization problem, including modeling the problem linearly or by using a multi-linear extension of a maximized submodular function. In any event, the solution to the optimization problem attempts to maximize or increase the utility from all of the jobs while reducing the probability of interruptions and associated overhead costs. The scheduler module 110 also monitors job progress and interruptions, which can be used to re-solve the optimization problem in response to the monitored changes in the environment.

In some embodiments, the optimization problem is represented by a stochastic correlated knapsack with a submodular target function, which can achieve approximately $$\frac{1-\frac{1}{\sqrt{e}}}{2} \cong 0.1967$$

of the optimal expected solution. The function $f$ is submodular in that for every A, B$\subseteq \mathcal{N}$: $f(A)+f(B) \geq f(A \cup B)+f(A \cap B)$. The optimization problem is modeled as $\mathcal{N}$ jobs that need to be scheduled on $\mathcal{M}$ different cloud computing instances, where the instances may have different hardware configuration or are located in different available zones such that they have different interruption patterns. Each instance has a finite supply, while the price and interruption patterns of each instance are independent from one another. For each instance, the length of time a job can run on it before interruption follows a known distribution. Thus, for each instance, a probability that the job uses a certain amount of the budget before it is interrupted can be obtained. The progress of each job is measured, for example, in epochs. Some processing time and cost is used for environment set up and snapshot restoration, which occurs each time a job is scheduled on an instance. This does not count toward progress. The utility of a job is a submodular function that captures the diminishing returns of the job (e.g., a machine learning training job). For a given budget, the function maximizes (in a mathematical sense) the total expected utility of all jobs using a stochastic correlated knapsack. Thus, in the stochastic correlated knapsack, there are n items, each having a random size and associated probability and reward, where the reward increases with the size. A budget is set for the total size of all n items, where the reward is to be maximized for the budget. The objective of the function is thus to find a set of the items n in the knapsack that provides the greatest reward, i.e., the greatest aggregated utility of the jobs.

As noted above, the scheduler module 110 selects the job(s) and the instance(s) by solving the stochastic correlated knapsack optimization problem. In some embodiments, the stochastic correlated knapsack problem is modeled linearly, for example, using a stochastic continuous greedy algorithm that, for a given lattice-submodular function $f$: $[\mathbb{M}]^n \to \mathbb{R}^+$, maximizes a multilinear extension $\overline{F}$: $2^n \to \mathbb{R}^+$ of a monotone set-submodular target function $\overline{f}$: $2^n \to \mathbb{R}_+$ over a solvable downward-closed polytope $\mathcal{P} \subseteq [0,1]^N$. Then, for a given fractional solution to the linear model (e.g., the output of the greedy algorithm), a rounding process outputs a sorted list of tuples (j, i, b), indicating job j is to be scheduled on instance i when no more than b budget has been consumed. An example rounding methodology is shown in FIG. 4.

The scheduler module 110 then selects the job(s) according to the sorted list of tuples one at a time as long as the budget consumed is no larger than b. In other words, jobs are scheduled in order according to the sorted list of tuples, but jobs in the list for which b exceeds the consumed budget are skipped. For example, if the next tuple in the list is (2, 1, 10), this indicates that job 2 should be scheduled on instance 2 if the budget consumed so far does not exceed $10. Thus, if the budget consumed is $8, which is less than $10, then job 2 will be scheduled on instance 2. On the other hand, if the budget consumed is $12, this tuple is skipped. This continues until all tuples have been considered by the scheduler module 110.

In some other embodiments, the stochastic correlated knapsack optimization problem is solved using a multi-linear extension of a submodular function. Given a fractional solution to the submodular function, a rounding process outputs a sorted list of tuples (j, i, b, t), indicating job j is to be scheduled on instance i with a maximum budget of b when no more than t budget has been consumed. In other words, each job and instance is selected (scheduled) in order according to the sorted list of tuples, but jobs in the list for which t exceeds the consumed budget are skipped. However, each skipped tuple is simulated as having been scheduled as if the budget b is consumed, such that the next tuple is considered with the consumed budget t has been reduced by b even though the skipped tuple was not actually executed. This helps ensure that the optimization problem maximizes or otherwise improves the utility of all of the jobs within the total budget allocated for executing the jobs.

Once the job 102 is selected, the scheduler module 110 stores the state of completion of the selected job as a checkpoint 302 in the event that the job is interrupted and subsequently restored. The checkpoint 302 can be used to restore the job to the last stored state of completion so that any prior results are not lost and so that the job does not need to be natively restarted. The checkpoint 302 is stored in a permanent storage 304 that can survive the termination of the instance 104a . . . 104n. In this manner, the job 102 can be restarted from the last checkpoint 302 if the job is previously interrupted. The scheduler module 110 then schedules the job 102 by sending a request to execute the job selected for execution to the designated instance 104a . . . 104n of the cloud services provider 104, which controls execution of the job independently of the scheduling system 106. During execution, the scheduler module 110 makes regular or occasional updates to the checkpoint 302 to capture the state of completion of the job as it progresses through execution. The most recent checkpoint 302 can then be used to minimize the amount of repeated processing if the job 102 is restarted after an interruption.

Once the job 102 is scheduled, the scheduler module 110 monitors the progress of the job. If the scheduler module 110 detects that the job 102 has been interrupted or has completed execution on the instance 104a . . . 104n, the scheduler module 110 selects one or more of the jobs 102 to be executed on one or more instances 104a . . . 104n based on the utility 202 and the remaining budget for executing the jobs. The remaining budget is the original budget for executing the jobs less any costs already incurred by previously scheduled jobs. Additionally, the utility 202 can be updated in response to an interruption or completion of the job, or other factors such as a change in cost to use the instances 104a . . . 104n, to obtain a more accurate estimate of the utility for a given job on a given instance. The job 102 selected here can be the same job that was interrupted or a different job, depending on the utility and remaining budget. Once a job 102 is selected, it is scheduled on the designated instance 104a . . . 104n, as described above. If the remaining budget is exhausted, the scheduler module 110 returns all of the most recent checkpoints 302 for the jobs 102 as the result.

Example Scheduling Methodology

Figure 5:
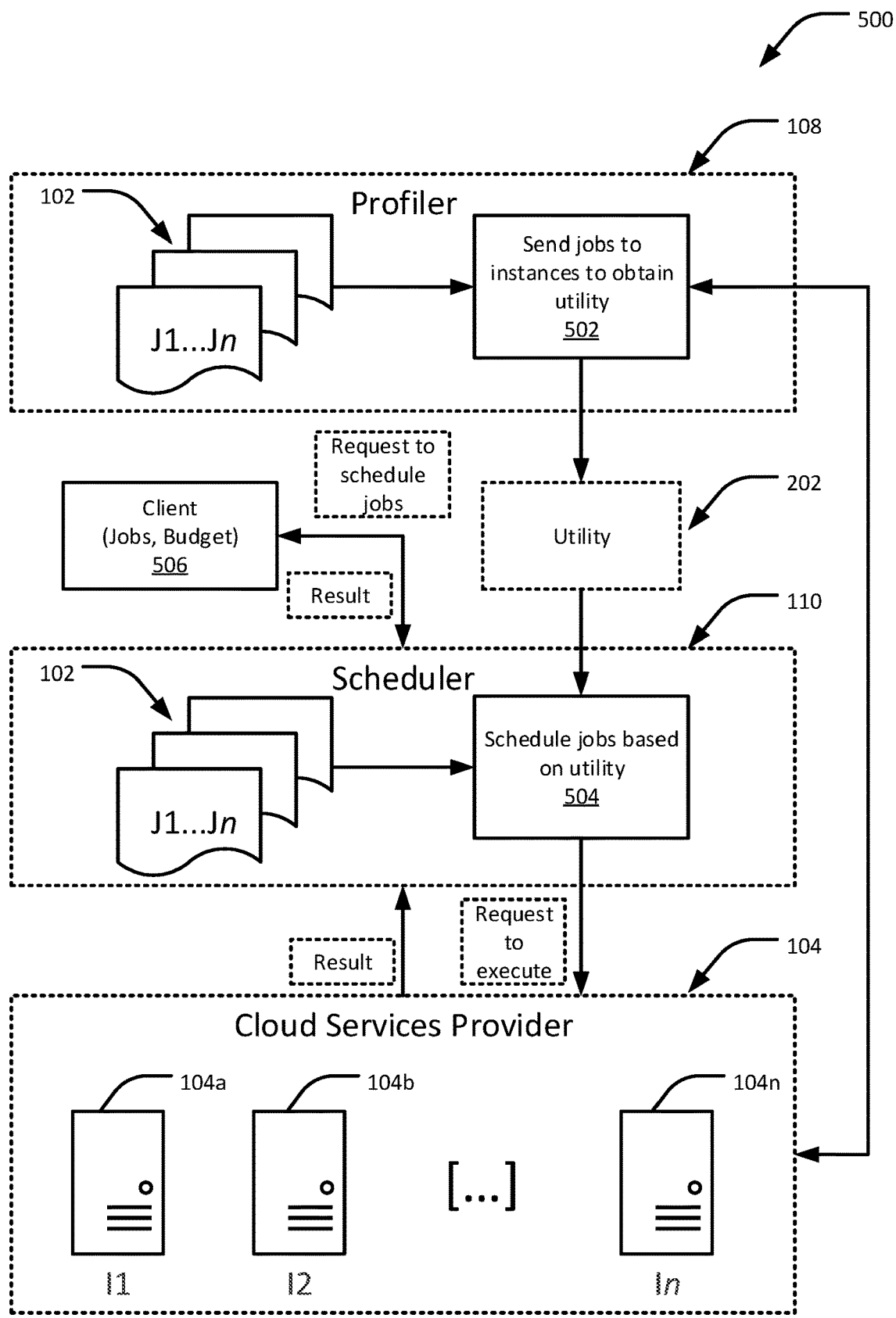
FIG. 5 is a block diagram of an example method for scheduling multiple jobs on one or more cloud computing instances, in accordance with an embodiment of the present disclosure.

FIG. 5 is a block diagram of an example method 500 for scheduling multiple jobs on one or more cloud computing instances, in accordance with an embodiment of the present disclosure. The method 500 can be implemented, for example, in the scheduling system 106 of FIG. 1. As will be discussed in further detail with respect to FIG. 6, one or more jobs 102 are sent 502 by the profiler module 108 to one or more cloud computing instances 104a . . . 104n for execution to obtain a utility function 202 for each of the jobs and instances. The utility 202 represents an expected amount of completion of each job 102 prior to an interruption.

After the utility 202 has been obtained for each job, the scheduler module 110 receives a request to schedule the jobs 102 from a client 506, where the request includes a budget representing a maximum permitted cost to execute a combination of the jobs (e.g., one or more of the jobs 102 in the request). In response to receiving the request, the scheduler module 110 schedules 504 the jobs and sends a request to execute the job selected for execution to the designated instance 104a . . . 104n. As will be described in further detail with respect to FIG. 7, the scheduler module 110 schedules 504 the jobs by selecting i) a job for execution from among the plurality of jobs and ii) a designated instance from among a plurality of cloud computing instances for executing the job selected for execution. The selection of jobs and instances is based on a probability distribution on a time and a cost of executing the job selected for execution on the designated instance before interruption, and where the probability distribution is based on a profiling of prior executions of other jobs on the designated instance. The selection is also based on the utility function 202, which jointly describes how the progress of each job is valued. The results of the jobs are passed back to the client 506 via the scheduler module 110.

Figure 6:
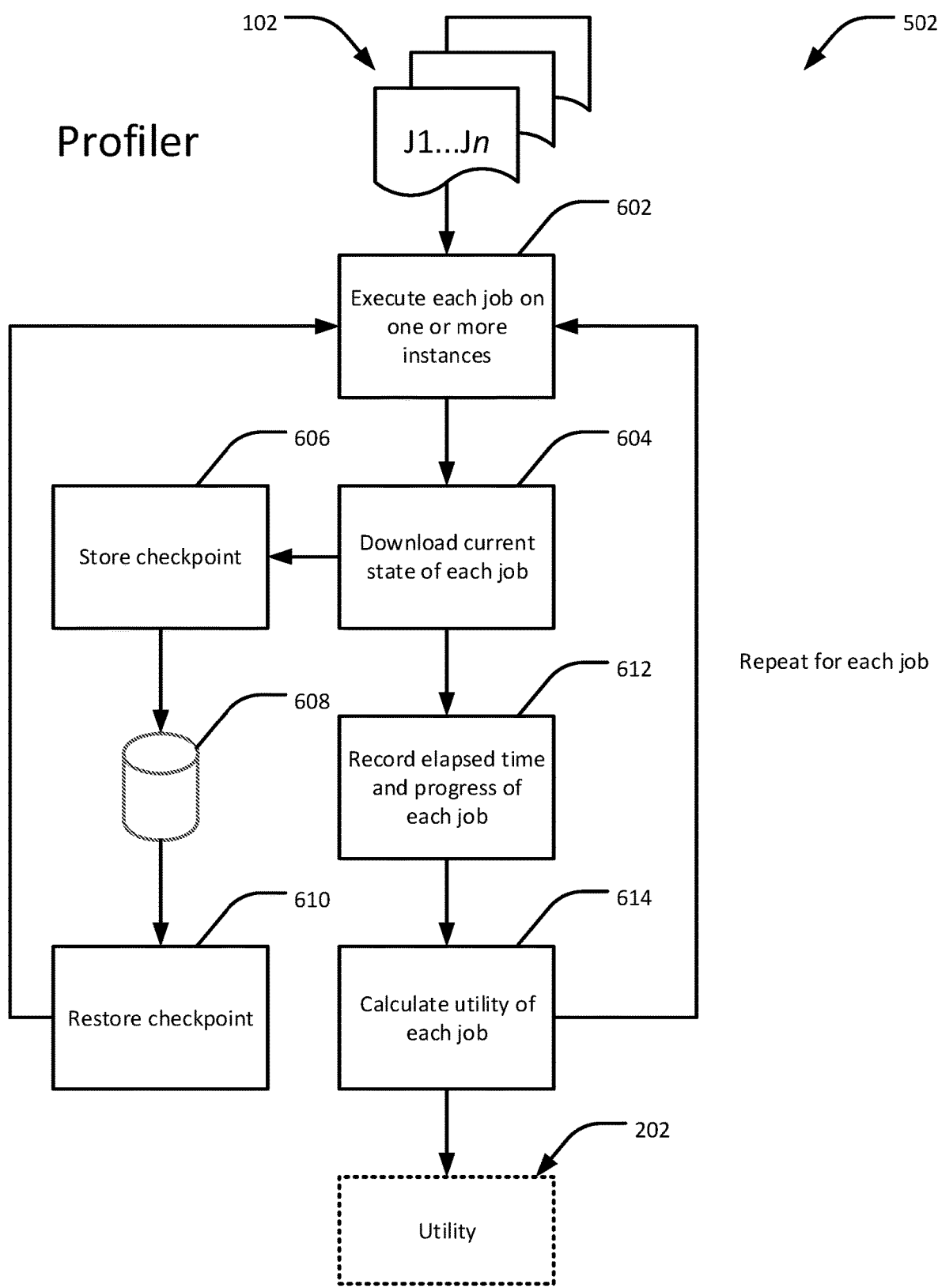
FIG. 6 is a block diagram of an example method for obtaining a utility function for each of a plurality of jobs, in accordance with an embodiment of the present disclosure.

FIG. 6 is a block diagram of an example method for sending 502, by the profiler module 108, one or more jobs 102 to one or more cloud computing instances 104a . . . 104n for execution to obtain a utility function 202 for each of the jobs and instances, in accordance with an embodiment of the present disclosure. The method 502 includes executing 602 each of the jobs 102 on one or more of the instances 104a . . . 104n. One of the purposes of executing the jobs on the instances is to collect information that is used to determine the utility function 202 of the jobs when they are run on a given instance. The utility 202 is then used by the scheduler module 110 to select which jobs 102 are to be scheduled on which instances 104a . . . 104n to maximize or increase the utility of all jobs for a given budget. The profiler module 108 does not necessarily attempt to execute all of the jobs 102 on all of the instances 104a . . . 104n, nor does the profiler module necessarily attempt to execute any of the jobs to completion. Rather, the profiler module 108 effectively generates utility data about historical job performance on a given instance that can be used by the scheduler module 110 to schedule the same or similar jobs on any of the instances 104a . . . 104n in the future.

The method 502 further includes downloading 604, from the respective instances 104a . . . 104n where the job(s) are executing, a current state of each job, also referred to as a checkpoint. The checkpoint is a snapshot of the job 102 at a given point in time and can be used to subsequently restart the job from the last known current state if the job is interrupted prior to completion, as opposed to restarting the job from the beginning. The checkpoint can be downloaded on a periodic basis, for example, every few minutes, during job execution to obtain the most current state of job execution. The method 502 further includes storing 606 the checkpoint to a storage 608 that persists after the instance 104a . . . 104n terminates. If a job 102 is interrupted, the method 502 further includes restoring 610 the checkpoint (last known current state of the job) and resuming execution 602 on the same instance 104a . . . 104n where the job was previously interrupted.

The method 502 further includes recording 612, during execution of the job, the elapsed execution time and progress (e.g., the number of completed epochs) of the job 102. The method 502 further includes calculating 614 the utility 202 of the job(s) 102 based on the recorded execution time and progress, along with the cost to execute the jobs on the respective instance 104a . . . 104n. As discussed above, the utility 202 of the job is the amount of completion (total progress) of the job at the point where the budget is consumed, including the overhead costs associated with rescheduling the job one or more times due to interruptions, which can be determined by repeating execution 602 of each job (from the latest checkpoint) after each interruption. For certain types of jobs with diminishing returns, such as machine learning training jobs, a monotone submodular function, such as described above, is used to model the utility 202. The method 502 can be repeated for any number of jobs 102.

Figure 7:
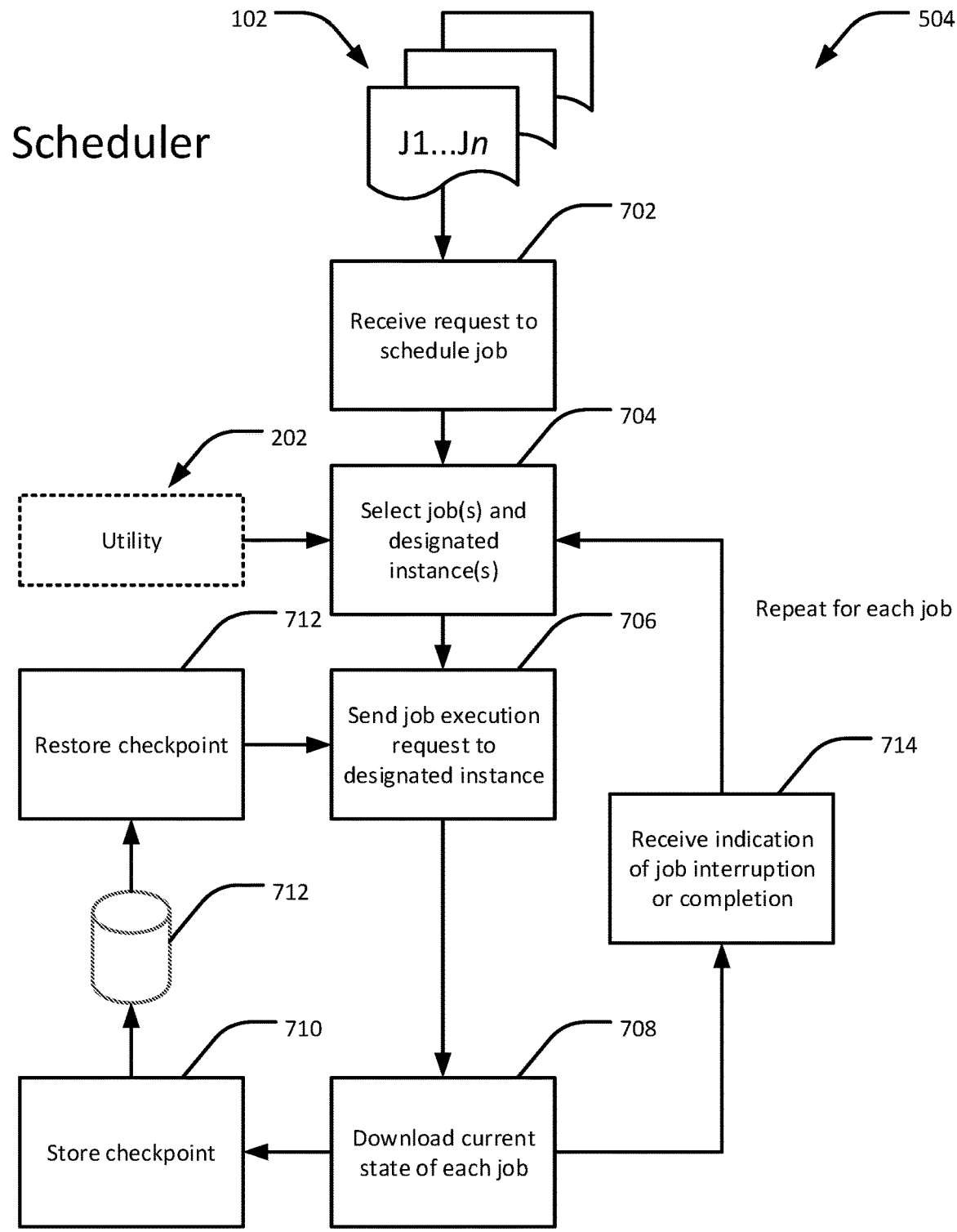
FIG. 7 is a block diagram of an example method for scheduling one or more jobs on one or more instances using the utility function, in accordance with an embodiment of the present disclosure.

FIG. 7 is a block diagram of an example method for scheduling 504, by the scheduler module 110, one or more jobs 102 to one or more cloud computing instances 104a . . . 104n, in accordance with an embodiment of the present disclosure. The method 504 includes receiving 702 a request to schedule a plurality of jobs 102. The request includes a budget representing a maximum permitted cost to execute a combination of one or more of the jobs 102. Note that not all of the jobs 102 in the request are necessarily scheduled for execution because the jobs are collectively constrained by the budget, which may not permit executing all of the jobs 102. Rather, the scheduler module 110 selects 704 one or more of the jobs 102 and one or more of the instances 104a . . . 104n based on the utility 202 and the budget while attempting to maximize the aggregated utility of all jobs that are executed for the given budget by solving the optimization problem discussed above. The selected job(s) are sent 706 to the designated instances with a request to execute the job.

The method 504 further includes downloading 708, from the respective instances 104a . . . 104n where the job(s) are executing, a current state of each job (checkpoint). As noted above, the checkpoint is a snapshot of the job 102 at a given point in time and can be used to subsequently restart the job from the last known current state if the job is interrupted prior to completion, as opposed to restarting the job from the beginning. The checkpoint can be downloaded on a periodic basis, for example, every few minutes, during job execution to obtain the most current state of job execution. The method 504 further includes storing 710 the checkpoint to a storage 712 that persists after the instance 104a . . . 104n terminates. If a job 102 is interrupted prior to completion, the method 504 further includes restoring 712 the checkpoint (last known current state of the job) and rescheduling execution of the job on a new instance 104a . . . 104n, or on the same instance where the job was previously interrupted, by sending 706 the job, with the checkpoint data, to the designated instance. Note that an interrupted job may not necessarily be rescheduled, depending on how much the job has been processed, the utility function 202 of the job, and the remaining budget after deducting the costs incurred for executing the interrupted job. For example, if a first job is interrupted, a second job can be selected 704 for execution on the designated instance based on a remaining budget and the utility function 202, the remaining budget being the budget less a cost of executing the first job on the designated instance prior to receiving the indication, and the utility function representing an expected amount of completion of the second job prior to an interruption.

The method 504 further includes receiving 714, from the designated instance 104a . . . 104n, an indication that the job selected for execution has completed execution or an indication that the job selected for execution has been interrupted during the execution. When a job that is executing is interrupted or completes execution, the method 504 selects 704 the same job 102 (if not yet completed), or a different job, to be scheduled for execution based on the utility 202 and the remaining budget, such as described above with respect to FIG. 3. For example, if a job 102 was interrupted but the remaining budget is insufficient to resume execution of that job, a different job can be selected if that job can be executed within the remaining budget, according to a solution of the optimization problem. A different job may be selected if that job has a greater marginal utility gain.

Example Computing Environment

Figure 8:
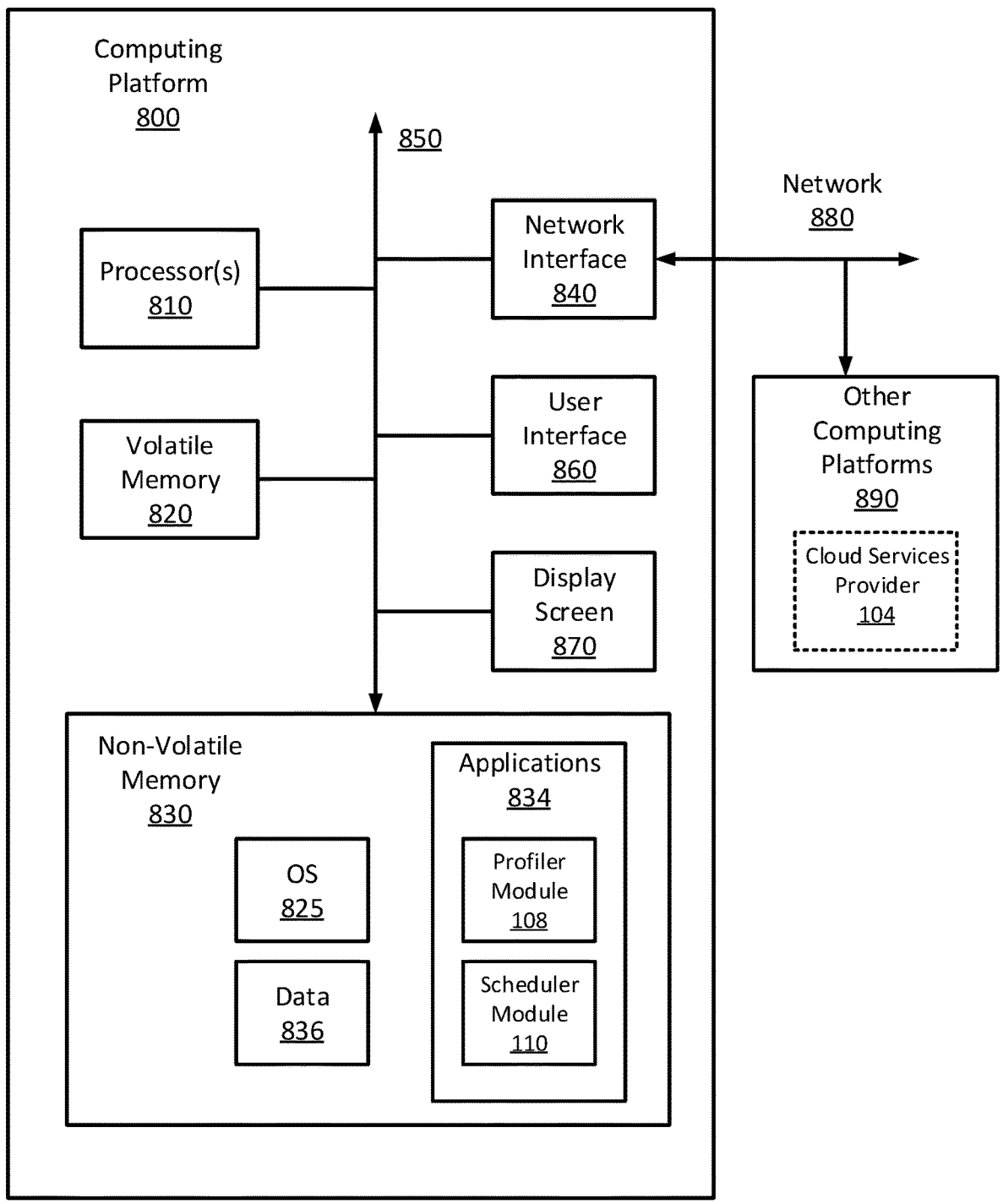
FIG. 8 is a block diagram of a computing platform configured to schedule jobs on cloud computing instances, in accordance with an example of the present disclosure.

FIG. 8 is a block diagram of a computing platform 800 configured to schedule jobs on cloud computing instances, in accordance with an example of the present disclosure. The computing platform or device 800 includes one or more processors 810, volatile memory 820 (e.g., random access memory (RAM)), non-volatile memory 830, one or more network or communication interfaces 840, a user interface (UI) 860, a display screen 870, and a communications bus 850. The computing platform 800 may also be referred to as a computer or a computer system. For example, the computing platform 800 can include a computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. In some embodiments, a distributed computational system is provided including a plurality of such computing platforms 800. Further note that the computing platform 800 can include, for example, a client in a client-server environment, a server in the client-server environment, or a combination of such clients and/or servers in a distributed processing environment.

The non-volatile (non-transitory) memory 830 includes: one or more storage devices 208 and/or one or more non-transitory computer-readable mediums having encoded thereon one or more computer-executable instructions or software for implementing techniques as variously described in this disclosure; one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof. For example, the memory 830 can include a computer system memory or random access memory, such as a durable disk storage (which includes any suitable optical or magnetic durable storage device, e.g., RAM, ROM, Flash, USB drive, or other semiconductor-based storage medium), a CD-ROM, or other computer readable mediums, for storing data and computer-readable instructions or software that implement various embodiments as taught in this disclosure. In some embodiments, the non-volatile memory 830 includes other types of memory as well, or combinations thereof. The non-transitory computer-readable medium includes, but is not limited to, one or more types of hardware memory, non-transitory tangible media (for example, one or more magnetic storage disks, one or more optical disks, one or more USB flash drives), and the like. The non-transitory computer-readable medium stores computer-readable and computer-executable instructions or software for implementing various embodiments (such as instructions for an operating system 825 and one or more executable applications 834). The non-volatile memory 830 is provided on the computing platform 800 or provided separately or remotely from the computing platform 800.

The user interface 860 can include one or more input/output (I/O) devices (e.g., a mouse, a keyboard, a microphone, one or more speakers, one or more biometric scanners, one or more environmental sensors, and one or more accelerometers, etc.).

The display screen 870 can provide a graphical user interface (GUI) and in some cases, may be a touchscreen or any other suitable display device.

The non-volatile memory 830 stores an operating system (OS) 825, one or more applications 834, and data 836 such that, for example, computer instructions of the operating system 825 and the applications 834, are executed by processor(s) 810 out of the volatile memory 820. In some examples, the volatile memory 820 can include one or more types of RAM and/or a cache memory that can offer a faster response time than a main memory. Data can be entered through the user interface 860. Various elements of the computer platform 800 can communicate via the communications bus 850. In some examples, the applications 834 can include the profiler module 108 and/or the scheduler module 110 of FIG. 1. The computing platform 800 executes any operating system 825, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing platform 800 and performing the operations described in this disclosure. In an embodiment, the operating system is run on one or more cloud machine instances. Thus, the illustrated computing platform 800 is shown merely as an example computing device and can be implemented by any computing or processing environment with any type of machine or set of machines that can have suitable hardware and/or software capable of operating as described herein.

The processor(s) 810 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor(s) 810 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. In a more general sense, any suitable combination of hardware, software, and firmware are used, as will be apparent.

The processor(s) 810 are configured to execute computer-readable and computer-executable instructions or software stored in the volatile memory 820 and/or the non-volatile (non-transitory) memory 830. In some examples, the processor(s) 810 includes multiple cores to facilitate parallel processing or may be multiple single core processors. Any number of processor architectures can be utilized, such as a central processing unit and co-processor, a graphics processor, and a digital signal processor. In some embodiments, virtualization is employed in the computing platform 800 so that infrastructure and resources are shared dynamically. For example, a virtual machine is provided to handle a process running on multiple processors so that the process appears to be using only one computing resource rather than multiple computing resources. Potentially, multiple virtual machines are also used with one processor. Furthermore, the network interface 840 includes any appropriate network chip or chipset which allows for wired or wireless connection between the computing platform 800 and a communication network 880 (such as a local area network) and other computing devices and resources.

The network interfaces 840 can include one or more interfaces to enable the computing platform 800 to access a computer network 880 such as a Local Area Network (LAN), a Wide Area Network (WAN), a Personal Area Network (PAN), or the Internet through a variety of wired and/or wireless connections, including cellular connections. In some examples, the network 880 may allow for communication with other computing platforms 890, to enable distributed computing. In some examples, the network 880 may allow for communication between the cloud services provider 104 and the scheduling system 106 of FIG. 1.

ADDITIONAL EXAMPLES

Example 1 provides a method for cloud computing instance scheduling, the method comprising: receiving a request to schedule a plurality of jobs, the request including a budget representing a maximum permitted cost to execute a combination of the jobs; selecting i) a job for execution from among the plurality of jobs and ii) a designated instance from among a plurality of cloud computing instances for executing the job selected for execution, wherein the selecting is based on a probability distribution on a time and a cost of executing the job selected for execution on the designated instance before interruption, the probability distribution based on a profiling of prior executions of other jobs on the designated instance and a utility function representing a value associated with a progress of each of the jobs; and sending a request to execute the job selected for execution to the designated instance.

Example 2 includes the subject matter of Example 1, further comprising: receiving, from the designated instance, an indication that the job selected for execution has completed execution or an indication that the job selected for execution has been interrupted during the execution; selecting a new designated instance from among a plurality of cloud computing instances for resuming execution of the job; and storing, in a processed job data store, a state of completion of the job selected for execution at or prior to interruption of execution.

Example 3 includes the subject matter of Example 2, wherein the indication is that the job selected for execution has been interrupted during the execution, and wherein the method further comprises sending, to the new designated instance, a request to resume execution of the job selected for execution starting from the state of completion of the job selected for execution at or prior to the interruption of execution.

Example 4 includes the subject matter of any of Examples 1-3, wherein the job selected for execution is a first job, and wherein the method further comprises: selecting a second job for execution on the designated instance based on a remaining budget and the utility function, the remaining budget being the budget less a cost of executing the first job on the designated instance prior to receiving the indication, the utility function representing an expected amount of completion of the second job prior to an interruption; and sending, to the designated instance, a job execution request for executing the second job on the designated instance.

Example 5 includes the subject matter of any of Examples 1-4, wherein the utility function is a submodular set function based on a probability distribution that the job selected for execution executes, on the designated instance, and a probability distribution that the job is interrupted after a certain period of time.

Example 6 includes the subject matter of any of Examples 1-5, wherein the utility function is a piece-wise linear increasing function of an execution progress of the job selected for execution and a probability that the job selected for execution executes, on the designated instance, to completion without interruption and within the respective budget.

Example 7 includes the subject matter of any of Examples 1-6, wherein the job selected for execution is a machine learning training job to be executed on a single, non-distributed cloud computing instance, the machine learning training job including a stochastic approximation process for training a machine learning model from a set of training data.

Example 8 provides a system for cloud computing instance scheduling, the system comprising: at least one processor; and a scheduler module executable by the at least one processor and configured to receive a request to schedule a plurality of jobs, the request including a budget representing a maximum permitted cost to execute a combination of the jobs; select i) a job for execution from among the plurality of jobs and ii) a designated instance from among a plurality of cloud computing instances for executing the job selected for execution, wherein the selecting is based on a probability distribution on a time and a cost of executing the job selected for execution on the designated instance before interruption, where the probability distribution is based on a profiling of prior executions of other jobs on the designated instance and a utility function representing a value associated with a progress of each of the jobs; and send a request to execute the job selected for execution to the designated instance.

Example 9 includes the subject matter of Example 8, the scheduler module further configured to: receive, from the designated instance, an indication that the job selected for execution has completed execution or an indication that the job selected for execution has been interrupted during the execution; select a new designated instance from among a plurality of cloud computing instances for resuming execution of the job; and store, in a processed job data store, a state of completion of the job selected for execution at or prior to interruption of execution.

Example 10 includes the subject matter of Example 9, wherein the indication is that the job selected for execution has been interrupted during the execution, and wherein the scheduler module is further configured to send, to the new designated instance, a request to resume execution of the job selected for execution starting from the state of completion of the job selected for execution at or prior to the interruption of execution.

Example 11 includes the subject matter of any of Examples 9-10, wherein the job selected for execution is a first job, and wherein the scheduler module is further configured to: select a second job for execution on the designated instance based on a remaining budget and the utility function, the remaining budget being the budget less a cost of executing the first job on the designated instance prior to receiving the indication, the utility function representing an expected amount of completion of the second job prior to an interruption; and send, to the designated instance, a job execution request for executing the second job on the designated instance.

Example 12 includes the subject matter of any of Examples 8-11, further comprising a profiler module executable by the at least one processor and configured to calculate the utility function as a submodular set function of a size of the job selected for execution and a probability that the job selected for execution executes, on the designated instance, to completion without interruption and within the respective budget.

Example 13 includes the subject matter of any of Examples 8-12, further comprising a profiler module executable by the at least one processor and configured to calculate the utility function as a piece-wise linear increasing function of an execution progress of the job selected for execution and a probability that the job selected for execution executes, on the designated instance, to completion without interruption and within the respective budget.

Example 14 includes the subject matter of any of Examples 8-13, wherein the job selected for execution is a machine learning training job to be executed on a single, non-distributed cloud computing instance, the machine learning training job including a stochastic approximation process for training a machine learning model from a set of training data.

Example 15 provides a computer program product including one or more non-transitory machine-readable mediums encoded with instructions that when executed by one or more processors cause a process to be carried out for cloud computing instance scheduling, the process comprising: receiving a request to schedule a plurality of jobs, the request including a budget representing a maximum permitted cost to execute a combination of the jobs; selecting i) a job for execution from among the plurality of jobs and ii) a designated instance from among a plurality of cloud computing instances for executing the job selected for execution, wherein the selecting is based on a probability distribution on a time and a cost of executing the job selected for execution on the designated instance before interruption, where the probability distribution is based on a profiling of prior executions of other jobs on the designated instance and a utility function representing a value associated with a progress of each of the jobs; and sending a request to execute the job selected for execution to the designated instance.

Example 16 includes the subject matter of Example 15, wherein the process further comprises: receiving, from the designated instance, an indication that the job selected for execution has completed execution or an indication that the job selected for execution has been interrupted during the execution; selecting a new designated instance from among a plurality of cloud computing instances for resuming execution of the job; and storing, in a processed job data store, a state of completion of the job selected for execution at or prior to interruption of execution.

Example 17 includes the subject matter of Example 16, wherein the indication is that the job selected for execution has been interrupted during the execution, and wherein the process further comprises sending, to the new designated instance, a request to resume execution of the job selected for execution starting from the state of completion of the job selected for execution at or prior to the interruption of execution.

Example 18 includes the subject matter of any of Examples 16 and 17, wherein the job selected for execution is a first job, and wherein the process further comprises: selecting a second job for execution on the designated instance based on a remaining budget and the utility function, the remaining budget being the budget less a cost of executing the first job on the designated instance prior to receiving the indication, the utility function representing an expected amount of completion of the second job prior to an interruption; and sending, to the designated instance, a job execution request for executing the second job on the designated instance.

Example 19 includes the subject matter of any of Examples 15-18, wherein the utility function is a submodular set function based on a probability distribution that the job selected for execution executes, on the designated instance, and that the job is interrupted after a certain period of time.

Example 20 includes the subject matter of any of Examples 15-19, wherein the utility function is a piece-wise linear increasing function of an execution progress of the job selected for execution and a probability that the job selected for execution executes, on the designated instance, to completion without interruption and within the respective budget.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It will be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for cloud computing instance scheduling, the method comprising:
   receiving a request to schedule a plurality of jobs, the request including a budget representing a maximum permitted cost to execute a combination of the jobs;
   selecting i) a first job for execution from among the plurality of jobs and ii) a designated instance from among a plurality of cloud computing instances for executing the first job selected for execution, wherein the selecting is based on a probability distribution on a time and a cost of executing the first job selected for execution on the designated instance before interruption, the probability based on a profiling of prior executions of other jobs on the designated instance and a utility function representing a value associated with a progress of each of the plurality of jobs including an overhead cost associated with rescheduling each of the plurality of jobs due to the interruption;
   sending a request to execute the first job selected for execution to the designated instance
   receiving, from the designated instance, an indication that the first job selected for execution has been interrupted during the execution;
   updating, responsive to receiving the indication, the utility function based on a remaining budget after deducting, from the budget, a cost incurred for executing the first job until the interruption occurred and the overhead cost
   selecting a second job for execution from among the plurality of jobs based on the updated utility function; and
   sending a request to execute the second job selected for execution to the designated instance.

2. The method of claim 1, further comprising:
   selecting a new designated instance from among the plurality of cloud computing instances for resuming execution of the first job; and
   storing, in a processed job data store, a state of completion of the first job selected for execution at or prior to interruption of execution of the first job.

3. The method of claim 2, further comprising sending, to the new designated instance, a request to resume execution of the first job selected for execution starting from the state of completion of the first job selected for execution at or prior to the interruption of execution of the first job.

4. The method of claim 2, wherein the utility function further represents an expected amount of completion of the second job prior to an interruption.

5. The method of claim 1, wherein the utility function is a submodular set function a probability distribution that the first job selected for execution executes, on the designated instance, and a probability distribution that the first job is interrupted after a certain period of time.

6. The method of claim 1, wherein the utility function is a piece-wise linear increasing function of an execution progress of the first job selected for execution and a probability that the first job selected for execution executes, on the designated instance, to completion without interruption and within the respective budget.

7. The method of claim 1, wherein the first job selected for execution is a machine learning training job to be executed on a single, non-distributed cloud computing instance, the machine learning training job including a stochastic approximation process for training a machine learning model from a set of training data.

8. A system for cloud computing instance scheduling, the system comprising:
   at least one processor; and
   a scheduler module executable by the at least one processor and configured to
   receive a request to schedule a plurality of jobs, the request including a budget representing a maximum permitted cost to execute a combination of the jobs;
   select i) a job for execution from among the plurality of jobs and ii) a designated instance from among a plurality of cloud computing instances for executing the job selected for execution, wherein the selecting is based on a probability distribution on a time and a cost of executing the job selected for execution on the designated instance before interruption, the probability distribution being based on a profiling of prior executions of other jobs on the designated instance and a utility function representing a value associated with a progress of each of the plurality of jobs including an overhead cost associated with rescheduling each of the plurality of jobs due to the interruption; and
   send a request to execute the job selected for execution to the designated instance.

9. The system of claim 8, the scheduler module further configured to:
   receive, from the designated instance, an indication that the job selected for execution has completed execution or an indication that the job selected for execution has been interrupted during the execution;

select a new designated instance from among the plurality of cloud computing instances for resuming execution of the job; and store, in a processed job data store, a state of completion of the job selected for execution at or prior to interruption of execution.

10. The system of claim 9, wherein the indication is that the job selected for execution has been interrupted during the execution, and wherein the scheduler module is further configured to send, to the new designated instance, a request to resume execution of the job selected for execution starting from the state of completion of the job selected for execution at or prior to the interruption of execution.

11. The system of claim 9, wherein the job selected for execution is a first job, and wherein the scheduler module is further configured to:

select a second job for execution on the designated instance based on a remaining budget and the utility function, the remaining budget being the budget less a cost of executing the first job on the designated instance prior to receiving the indication and the overhead cost, the utility function representing an expected amount of completion of the second job prior to an interruption; and send, to the designated instance, a job execution request for executing the second job on the designated instance.

12. The system of claim 8, further comprising a profiler module executable by the at least one processor and configured to calculate the utility function as a maximized submodular set function of a size of the job selected for execution and a probability that the job selected for execution executes, on the designated instance, to completion without interruption and within the respective budget.

13. The system of claim 8, further comprising a profiler module executable by the at least one processor and configured to calculate the utility function as a piece-wise linear increasing function of an execution progress of the job selected for execution and a probability that the job selected for execution executes, on the designated instance, to completion without interruption and within the respective budget.

14. The system of claim 8, wherein the job selected for execution is a machine learning training job to be executed on a single, non-distributed cloud computing instance, the machine learning training job including a stochastic approximation process for training a machine learning model from a set of training data.

15. A computer program product including one or more non-transitory machine-readable mediums encoded with instructions that when executed by one or more processors cause a process to be carried out for cloud computing instance scheduling, the process comprising:

receiving a request to schedule a plurality of jobs, the request including a budget representing a maximum permitted cost to execute a combination of the jobs;

selecting i) a job for execution from among the plurality of jobs and ii) a designated instance from among a plurality of cloud computing instances for executing the job selected for execution, wherein the selecting is based on a probability distribution on a time and a cost of executing the job selected for execution on the designated instance before interruption, the probability distribution being based on a profiling of prior executions of other jobs on the designated instance and a utility function representing a value associated with a progress of each of the plurality of jobs including an overhead cost associated with rescheduling each of the plurality of jobs due to the interruption; and sending a request to execute the job selected for execution to the designated instance.

16. The computer program product of claim 15, wherein the process further comprises:

receiving, from the designated instance, an indication that the job selected for execution has completed execution or an indication that the job selected for execution has been interrupted during the execution;

selecting a new designated instance from among the plurality of cloud computing instances for resuming execution of the job; and storing, in a processed job data store, a state of completion of the job selected for execution at or prior to interruption of execution.

17. The computer program product of claim 16, wherein the indication is that the job selected for execution has been interrupted during the execution, and wherein the process further comprises sending, to the new designated instance, a request to resume execution of the job selected for execution starting from the state of completion of the job selected for execution at or prior to the interruption of execution.

18. The computer program product of claim 16, wherein the job selected for execution is a first job, and wherein the process further comprises:

selecting a second job for execution on the designated instance based on a remaining budget and the utility function, the remaining budget being the budget less a cost of executing the first job on the designated instance prior to receiving the indication, the utility function representing an expected amount of completion of the second job prior to an interruption; and sending, to the designated instance, a job execution request for executing the second job on the designated instance.

19. The computer program product of claim 15, wherein the utility function is a submodular set function based on the probability distribution that the job selected for execution executes, on the designated instance, and the probability distribution that they get interrupted after a certain period of time.

20. The computer program product of claim 15, wherein the utility function is a piece-wise linear increasing function of an execution progress of the job selected for execution and a probability that the job selected for execution executes, on the designated instance, to completion without interruption and within the respective budget.

* * * * *